March 6, 1951 R. GOLICKE 2,544,017
OSCILLATOR CIRCUIT ARRANGEMENT
Filed March 27, 1946

INVENTOR
ROMAN GOLICKE
BY H. S. Grover
ATTORNEY

Patented Mar. 6, 1951 2,544,017

UNITED STATES PATENT OFFICE 2,544,017

OSCILLATOR CIRCUIT ARRANGEMENT

Roman Golicke, Finkebkrug-Osthavelland, Germany; vested in the Attorney General of the United States Application March 27, 1946, Serial No. 657,417
In Germany October 7, 1939

Section 1, Public Law 690, August 8, 1946
Patent expires October 7, 1959

4 Claims. (Cl. 250—36)

Figure 1:
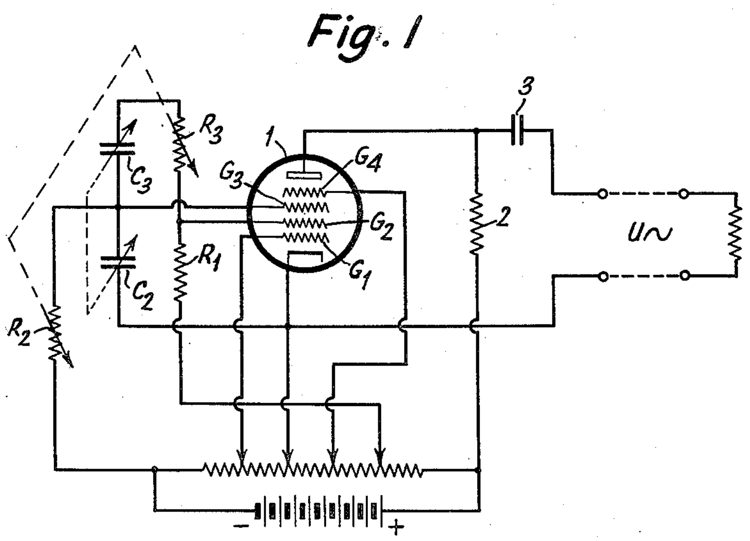

This invention relates to systems for wave generation and amplification and utilizes a regenerative multi-grid type of tube with current-limiting means. Frequency regulation or tuning is obtained solely by the aid of resistances and condensers. Oscillators or wave generators in which tuning to certain frequencies is obtained by resistances and condensers offer essential advantages over the conventional arrangements predicated upon tuning by the aid of inductances and capacities. In the first place, where tuning is effected with resistances and condensers the frequency range or band can be enlarged considerably. Another merit of such a scheme is that tuning in decade steps is feasible and that the feed-back factor is kept constant. In generators comprising resistance-capacity tuning means as known in the art very exacting demands are imposed on the tube characteristic compared with a generator having a tuned oscillatory circuit. Selectance is rather limited; hence, the attempt to reduce the noise factor due to non-linear harmonic distortion, and to maintain a high frequency stability is attended with great practical difficulties. To minimize the non-linear harmonic distortion, rectilinear operation of the tube must be achieved to a large degree. To assure adequate frequency stability the properties of the tube must, as far as feasible, be independent of the working voltages and other variable factors.

These drawbacks in a circuit organization as here disclosed which is predicated upon the use of resistances and condensers for frequency control are obviated by using a current-limited multi-grid type of tube with oscillatory circuit rather than a voltage-limited regenerative circuit organization (audion circuit scheme) operating with grid current.

In the arrangement here disclosed the operating point is preferably placed in the steepest point of a current-distribution characteristic with double bend. The drive range may extend over a portion of the characteristic inside the region of negative grid potentials. Owing to the absence of grid current flow, action on the frequency is substantially reduced. Other factors liable to affect frequency stability may be compensated and rendered harmless by means of stabilizing and compensator steps in the tube to a large extent. Since the grid drive covers only the practically straight portion of the characteristic in the neighborhood of the reversal point, distortions will be small even without the filter or excluding effect of an oscillation or tuned circuit.

In the case of control action based upon current-distribution two different feed-back schemes are practicable according to whether the potential required for maintenance of the oscillation is derived from a positive tube electrode located below or above the control grid. The feed-back potential for maintaining oscillations, however, is preferably obtained from a positive tube electrode which, looking from the cathode, is mounted ahead of the control grid. An arrangement of this kind requires circuits that are particularly simple inasmuch as there is no need for phase reversal in the feed-back potential. In fact, frequency regulation or tuning is accomplishable in this case by means of two condensers and two resistances. In lieu of two resistances and two condensers, the frequency governing network or mesh could comprise also of a greater number of condensers and resistances.

For tuning it is advantageous to alter simultaneously the two frequency-determining condenser or the two frequency-determining resistances. If the tuning is effected only by the aid of condensers, this plan offers the advantage that in this way the impedance of the frequency-governing elements for the ensuing frequency remains constant. Hence, the regeneration factor becomes perfectly independent of the frequency. The condensers could consist of two synchronized ganged condensers of the kind customarily used in radio apparatus.

Frequency tuning, however, is feasible also by the aid of the resistances. It is, moreover, possible to alter both the resistances as well as the condensers. In varying the resistances, however, there results also a change in the impedances of the tuning part. Hence, the impedance is preferably chosen high in contrast to the working resistance in order that conditions may be made so that the action upon the feed-back factor becomes as low as possible. In order to remove also the last trace of action upon the feed-back factor, it is advantageous not to alter the resistances by the same factor, but rather in such a way that when the resistance values are lower, the feedback factor, that is, the ratio of the partial potentials, is raised.

By changing the condensers and/or the resistances in steps or stages, that is, discontinuously, it is possible to obtain several frequency bands. The steps may then be chosen that a decimal or decadic frequency graduation results. The condensers and/or the resistances which serve to determine the frequency could also consist of capacities and resistances in the form of tubes or of other circuit elements. Thus, for instance, one or two of the condensers could consist of the capacity controlled by way of the slope (mutual conductance) of a type of tube having a high internal resistance. It is also possible to use hot-conductors (resistances with a negative temperature coefficient) for the resistances such as indirectly heated resistances subject to remote electrical control. Known regulators of this type offer the advantage of a relatively wide range of regulation. It is thus feasible to push the tuning up to 1:100 and over with continuous variation ratio.

In an arrangement as here disclosed it is an easy matter to vary the amplitude by regulating the slope or mutual conductance of the tube. It becomes thus possible to operate safely with reduced grid drive, that is, to make the non-linear harmonic distortion factor low. What is presupposed to this end is that the tuning point is placed in the reversal point of the characteristic, this resulting in a voltage maximum and a minimum distortion factor. However, it would be useless to carry the reduction of the distortions in generators by extremely limited drive range very far for the reason that, since the limitation is very "soft," this means great sensitiveness to circuit noise and outer stray potentials. However, such a sensitive and critical adjustment is desirable where the circuit organization is to be used for a selective amplifier (feed-back filter).

For amplitude regulation a voltage may be impressed upon a grid interposed between the accelerator grid pertaining to the feed-back circuit and the cathode which serves to change the slope (amplitude). For automatic stabilization of the output amplitude, the regulator or control potential impressed upon the grid adjacent to the cathode may be derived or tapped from the output potential. The output potential, or a part thereof may be rectified by rectifiers of the dry or oxide or Westector type, the ensuing rectified potential serving for regulation or control as stated. By automatic amplitude regulation it is possible to still more enlarge the frequency range inasmuch as such alterations of the feed-back factor as have been occasioned by frequency tuning are eliminated. Moreover, amplitude variations and fluctuations can be minimized owing to the fact that coarse compensation or equalization of the feed-back factor is secured by the choice of appropriate dimensions for the frequency-governing resistances.

The circuit organization of this invention may operate both as a wave generator (oscillator) as well as act as a selective amplifier (feed-back filter). In this latter instance the grid closest to the cathode is fed with a control alternating potential to which the frequency-determining resistances and condensers are tuned. Now, according to whether the feed-back factor is proportioned so that natural oscillations have a chance to build up or whether the feed-back is pushed only to a point where oscillations will not yet be generated, there results a generator or a regenerative amplifier. The transition or change from one state to the other will become so much more gentle, the more exactly the operating point has been placed just in the reversal of the characteristic. By suitable adjustment of the operating point, it is thus feasible in current-limited regenerative arrangements to make the manipulation of the feed-back means very convenient, contradistinct from what is true of voltage-limited circuit organizations such as the audion type. In the case of the spill-over generator it is also possible to supply as the control alternating potential a frequency which is a multiple or a submultiple of the frequency to which the circuit organization is tuned. The arrangement may thus be used for frequency division or frequency multiplication.

Where the circuit organization of the invention is used to operate as a wave generator it is also possible to feed the grid which is adjacent to the cathode a modulation potential in order to obtain a modulated wave generator.

Figure 2:
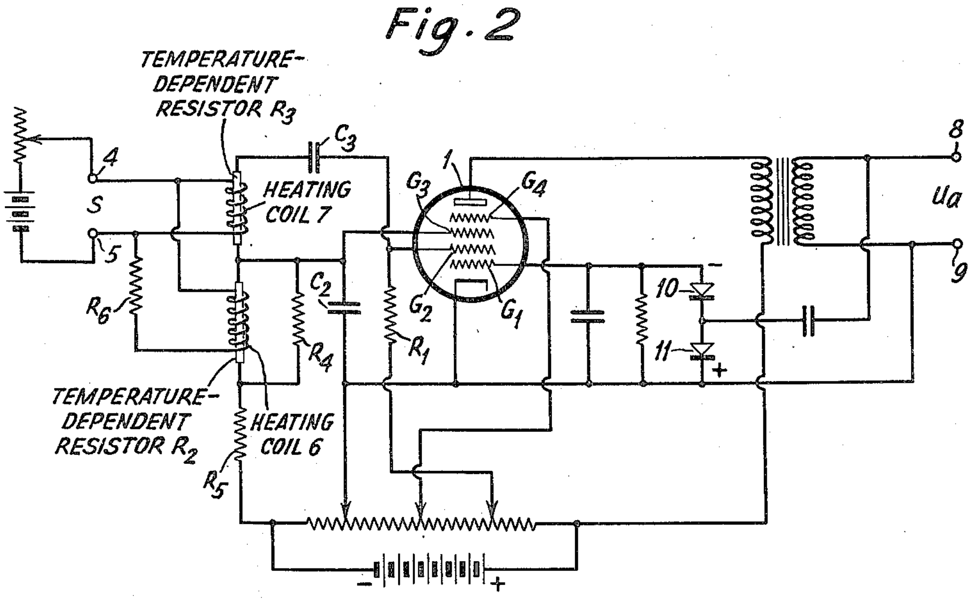

The invention will now be explained more fully by reference to the appended drawing in which Figure 1 shows an exemplified embodiment of the circuit arrangement as here disclosed, and Fig. 2 shows a modified circuit arrangement.

Referring to Fig. 1, the multi-grid tube 1 in this instance is furnished with four grids $G_1$—$G_4$. The potential which is required to sustain the oscillations is derived from the accelerator grid $G_2$ which is mounted ahead of (or below) the control grid $G_3$. The alternating potentials which are set up across the working resistance $R_1$ are imparted by way of the frequency-determining network or mesh comprising resistances $R_2$ and $R_3$ and condensers $C_2$ and $C_3$ to the grid 3. The said network conducts alternating potentials of a definite frequency with zero phase angle and maximum amplitude to the control grid $G_3$. For the natural frequency there holds the following relation:

$$f=\frac{1}{2\pi\sqrt{R_2\cdot R_3\cdot C_2\cdot C_3}}$$

while the feed-back factor is a function of the ratio of the alternating potentials $U_1$ (between grid 3 and cathode) and $U_2$ (between grid 2 and grid 3), thus:

$$\frac{U_1}{U_2}=\frac{R_2\cdot C_3}{(R_3\cdot C_3)+(R_2\cdot C_2)}$$

In order that in frequency tuning the feed-back factor may not be effected through the ratio of the partial potentials, it will be preferable to vary the two condensers $C_2$ and $C_3$ or the two resistances $R_2$, $R_3$ simultaneously. If tuning is effected only by the aid of the condensers then the impedance of the elements which govern the frequency will stay constant for the ensuing frequency. As a result the feed-back factor in case of variation of the condensers, stays perfectly independent of the frequency. Where two-gang condensers of the kind customary in broadcast work are employed, there results a logarithmic frequency curve with a ratio of variation of around 1:7.5.

In case of frequency variation through the resistances $R_2$ and $R_3$ the impedance of the tuning means is variable. However, in order to minimize the action upon the feed-back factor it is expedient to make the same high compared to the working resistance $R_1$. Whatever action upon the feed-back may remain can be eliminated by varying the resistances $R_2$ and $R_3$ not by the same factor, but rather in such fashion that in the presence of small resistance values the ratio of the partial potential as above indicated $U_1$:$U_2$ is somewhat greater with the consequence that the feed-back becomes somewhat greater.

The grid $G_1$ is impressed with a negative potential. By variation of this potential it is possible to act upon the slope or mutual conductance of the tube and thus the output amplitude. The load circuit may be coupled with the circuit organization by the aid of a transformer or a resistance-condenser assembly comprising resistance 2 and condenser 3.

Fig. 2 shows an exemplified embodiment of a circuit organization according to the invention in which the tuning is subject to electrical control action and which comprises automatic amplitude regulation. For electrical control of the tuning are here used hot-conductors such as those of the type hereinbefore mentioned. The pilot or control potential consists here of a voltage S impressed across the terminals 4 and 5. Resistances $R_2$ and $R_3$ consist of thermal regulator resistances (Urdox regulators). Synchronization of the two regulator resistances is insured by paralleling of their heater wires 6 and 7. In order to make the feed-back factor as free from frequency effects as feasible, the potential ratio $U_1:U_2$ as hereinbefore described is made a function of the value of the regulator resistances. The feed-back factor at the lower end of the frequency band is reduced by a high-ohm resistance $R_4$ connected in parallel relation to the regulator $R_2$, while at the upper end it is raised by a series resistance $R_5$. Another way of equalizing is by the aid of the fixed resistance $R_6$ in series with the heater wire 6, the influence of the said resistance $R_6$ growing with growth of heating current. By choosing suitable values for the resistances $R_4$, $R_5$ and $R_6$ it will then be feasible to secure a roughly constant output potential, without amplitude regulation, for frequency changes of an order of magnitude 1:10.

In the circuit organization shown in Fig. 2 recourse is had to amplitude regulation or limitation which works upon the grid $G_1$ of tube 1 being adjacent to the cathode. The output potential $U_a$ arising across the terminals 8 and 9 is rectified by means of a rectifier arrangement consisting of the two Westectors 10 and 11. The ensuing regulator potential is impressed (with its negative pole) upon the first grid $G_1$ of the oscillator tube. By virtue of the automatic amplitude regulation, conditions are made so that a large frequency band (say, 1:100) may be covered in a continuous way. The amplitude fluctuations are slight, particularly if the values of the resistances $R_4$, $R_5$ and $R_6$ are suitably chosen so as to insure a course equalization of the feed-back factor. By regulator circuits of still greater slope the constancy of the output potential may be enhanced still further.

In order that large frequency ranges or bands may be covered it will be found advantageous to provide ways and means for waveband switching, and for this purpose could be used the two non-continuously variable frequency-governing elements. In the case of embodiment Fig. 1 these are the resistances $R_2$ and $R_3$, and in the embodiment Fig. 2 the condensers $C_2$ and $C_3$. Because of the straight-line dependence of the frequency, this insures an extremely great frequency band. As has been ascertained by practical tests it is possible by the aid of resistances of 3,000 ohms to 3 megohms and condensers ranging in size between 100 micromicrofarad and 10 microfarad in other words, wholly customary sizes, a frequency band extending all the way from around .05 C. P. S. up to 500 kc. The frequency tuning could also be in stages of decade units.

In arrangements comprising automatic amplitude or volume control means care must be taken so that no additional distortion of any appreciable size will be introduced by the rectifiers which are employed for the production of the regulator voltage. For instance, the rectifiers 10 and 11 shown in the arrangement Fig. 2, with a view to avoiding additional distortions, may be connected with a low-ohm output winding, while being terminated high-ohm. In regenerative circuit organizations which are fed from the accelerator grid in which the anode or plate is the output electrode, the feed-back factor is a function of the working resistance at the plate end. This fact is ascribable to a loss of slope of the characteristics of the second grid occasioned by an increase of the plate resistance. However, the effect upon the slope is but small provided that a screen grid is placed ahead of the plate, as is true, for instance, of hexodes, with the result that the transparency or penetration of the plate upon the current-distribution control is diminished. This dependence upon the load manifests itself as follows:

In the presence of low values of the load resistance the voltage is proportional to the working resistance since only low alternating potentials arise at the plate, and these produce no appreciable reactions upon the distribution of the current. But as the resistance grows these alternating potential become higher, and because of the fact that their reactions are thus greater, they cause the feed-back to be reduced, and this may be driven to a point where the oscillations are caused to discontinue. Inside certain limits it will thus become feasible to secure an output potential which is unaffected by the load, without automatic volume or amplitude control being used. In this case and to that end the circuit organization is so dimensioned that maximum output potential arises in the presence of a mean load. The reactions of output load upon frequency are lessened by the screen grid mounted ahead of the plate. The reactions can be still further reduced by neutralizing arrangements.

I claim:

1. A resistance-capacity tuned oscillator circuit arrangement comprising an electron discharge device having a cathode and anode, an output circuit connected between the cathode and anode, and said device having a plurality of grids including two which cooperate with the cathode to produce oscillations, one of said two being located between the other of said two and the cathode, a direct current source and intermediate taps, connections between said source for supplying positive and negative potentials to said anode and cathode respectively, connections between said source and said two grids for supplying to said one grid a relatively high and to the other a relatively low direct current potential, the relatively high potential supplied to the one grid being intermediate the plate and cathode potentials and each of said last named connections including a resistance, a connection between said two grids, consisting of a capacitor and a resistance of substantial value in series with one another, a capacitor forming a direct connection between the other of said two grids and the cathode, a third grid between said one grid and the cathode and connections for supplying to said third grid a potential negative to the cathode.

2. The oscillator set forth in claim 1 wherein means is provided for varying the frequency of the oscillations produced, said means consisting of means for simultaneously varying the capacity of said capacitors.

3. The oscillator set forth in claim 1 wherein means is provided for varying the frequency of the oscillations produced said means consisting of means for simultaneously varying the resistance in the connection between the source and said other grid and the resistance in the connection between said two grids.

4. The oscillator circuit arrangement as claimed in claim 1 wherein there is provided a screen grid between said other grid and said plate with connections to said source for supplying said screen grid a potential intermediate the potential of said other grid and plate, whereby changes in frequency under load variations are reduced.

ROMAN GOLICKE.

REFERENCES CITED

The following references are of record in the file of this patent:

UNITED STATES PATENTS

| Number | Name | Date |
|---|---|---|
| 2,024,489 | Van Der Pol et al. | Dec. 17, 1935 |
| 2,109,752 | Poch et al. | Mar. 1, 1939 |
| 2,172,746 | Young | Sept. 12, 1939 |
| 2,250,066 | Manatt | July 22, 1941 |
| 2,292,439 | Golicke | Aug. 11, 1942 |
| 2,444,084 | Artzt | June 29, 1948 |

FOREIGN PATENTS

| Number | Country | Date |
|---|---|---|
| 524,314 | Great Britain | Aug. 2, 1940 |